May 12, 1936.  J. A. FORTES  2,040,649

EGG HOLDER

Filed July 20, 1935   2 Sheets-Sheet 1

INVENTOR:
JAMES A. FORTES.

ATTORNEY.

May 12, 1936. J. A. FORTES 2,040,649
EGG HOLDER
Filed July 20, 1935  2 Sheets-Sheet 2
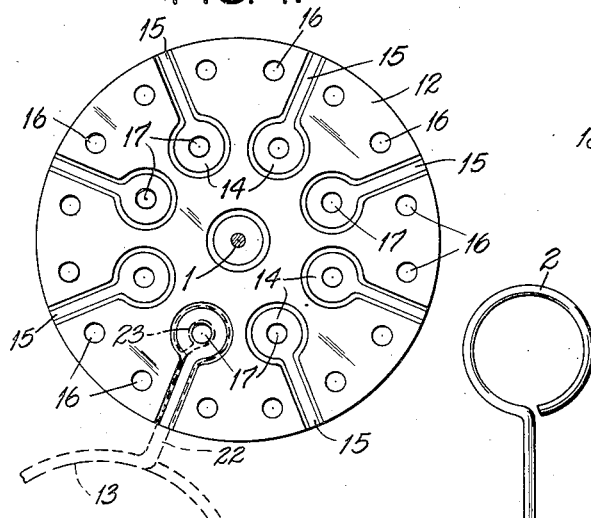
FIG. 4.
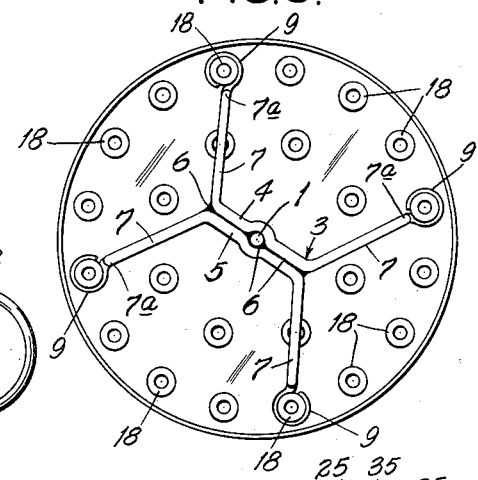
FIG. 5.
FIG. 6.
FIG. 7.
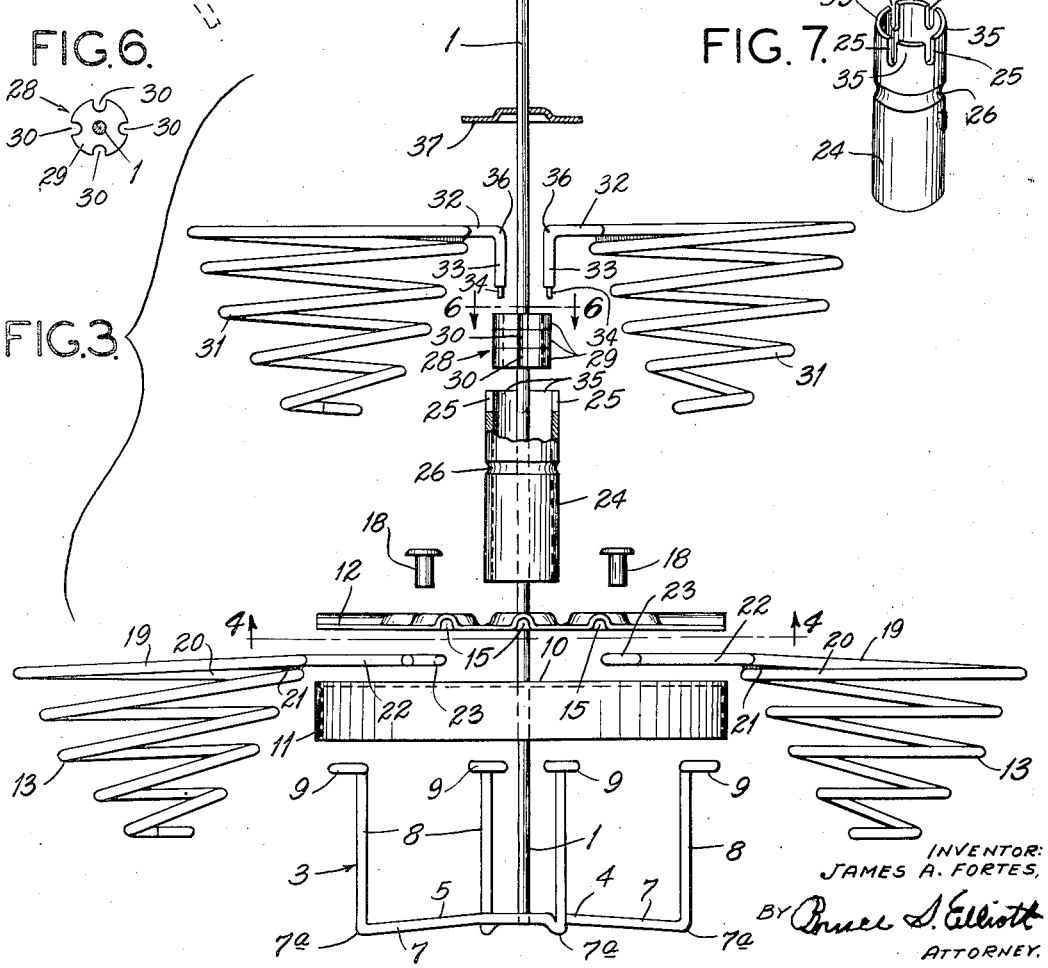
FIG. 3
INVENTOR:
JAMES A. FORTES,
BY *Bruce S. Elliott*
ATTORNEY.

Patented May 12, 1936

2,040,649

UNITED STATES PATENT OFFICE 2,040,649

EGG HOLDER

James A. Fortes, St. Louis, Mo.

Application July 20, 1935, Serial No. 32,334

10 Claims. (Cl. 53—1)

This invention relates to certain new and useful improvements in egg holders of the general type disclosed in my pending applications, Serial No. 23,149, filed May 24, 1935, and Serial No. 26,500, filed June 13, 1935.

It is the object of the present invention, however, to provide a device of this general character which will accommodate a much larger number of eggs, than is possible with either of my prior devices, which increased capacity is due to the novel construction and combination of parts which will hereafter be described in detail.

A further object of the invention is to provide a device in the nature of an egg holder having certain of the baskets or containers of such size as to accommodate articles larger than eggs, such, for example, as onions or potatoes, so that the housewife may use certain of the containers for eggs and certain other of the containers for onions or potatoes, or both. For example, in making potato salad, the principal cooked ingredients required are hard boiled eggs and boiled potatoes. My improved device enables the eggs and potatoes to be immersed in the water of the same vessel and to be boiled simultaneously. If it is desired to boil the onions, a certain number of them could also be placed in the baskets or containers, and all three articles cooked at the same time. If one article should require a longer period of boiling than the other, or others, said other article or articles, could be removed and the article requiring the longer time of boiling returned to the boiling water. However, as my device is particularly intended for eggs, onions and potatoes, it would ordinarily do no harm, where hard boiled eggs are required, to permit the eggs to remain in the boiling water until the potatoes, or onions, or both, as the case may be, have been sufficiently cooked.

Of course, where the device is to be used for cooking soft boiled eggs, it is employed in the ordinary manner, and all of the baskets, or as many as desired, filled with eggs and the device submerged in water and withdrawn when the eggs have boiled the desired length of time. When so used, my device differs from the devices of my prior applications in the greater capacity it affords; the construction enabling me to secure such increased capacity resulting, to a large extent, from combining certain features of my two prior applications to produce a composit device, which enables me to secure such increased capacity without materially increasing the size of the device over that of the larger of my two prior devices, which is adapted to hold six eggs.

The present invention is characterized by the fact that it affords two superposed series of baskets, or holders, the lower series having eight of such baskets, or holders, and the upper series, in the present case, having four; and important features of the present invention relate to the manner of securing the two series of baskets or holders in their respective supports, and of rigidly connecting the two supporting structures together, so as to present a compact device possessing firmness and rigidity of structure.

The invention is illustrated in the accompanying drawings, in which,—

Figure 3 is a view partly in section and partly in elevation showing all the parts of the device disassembled, but arranged in the order in which they are to be assembled;

Figure 4 is a bottom sectional plan view taken on the line 4—4 of Figure 1 illustrating, particularly, certain recesses in the underside of the upper clamping plate;

Figure 5 is a bottom plan view of the lower central supporting member illustrating the manner of securing the support for the device thereto;

Figure 6 is a sectional plan view illustrating the grooves in a composit plug employed in the upper supporting member; and Figure 7 is a perspective view illustrating a cylindrical upper supporting member.

Figure 1:
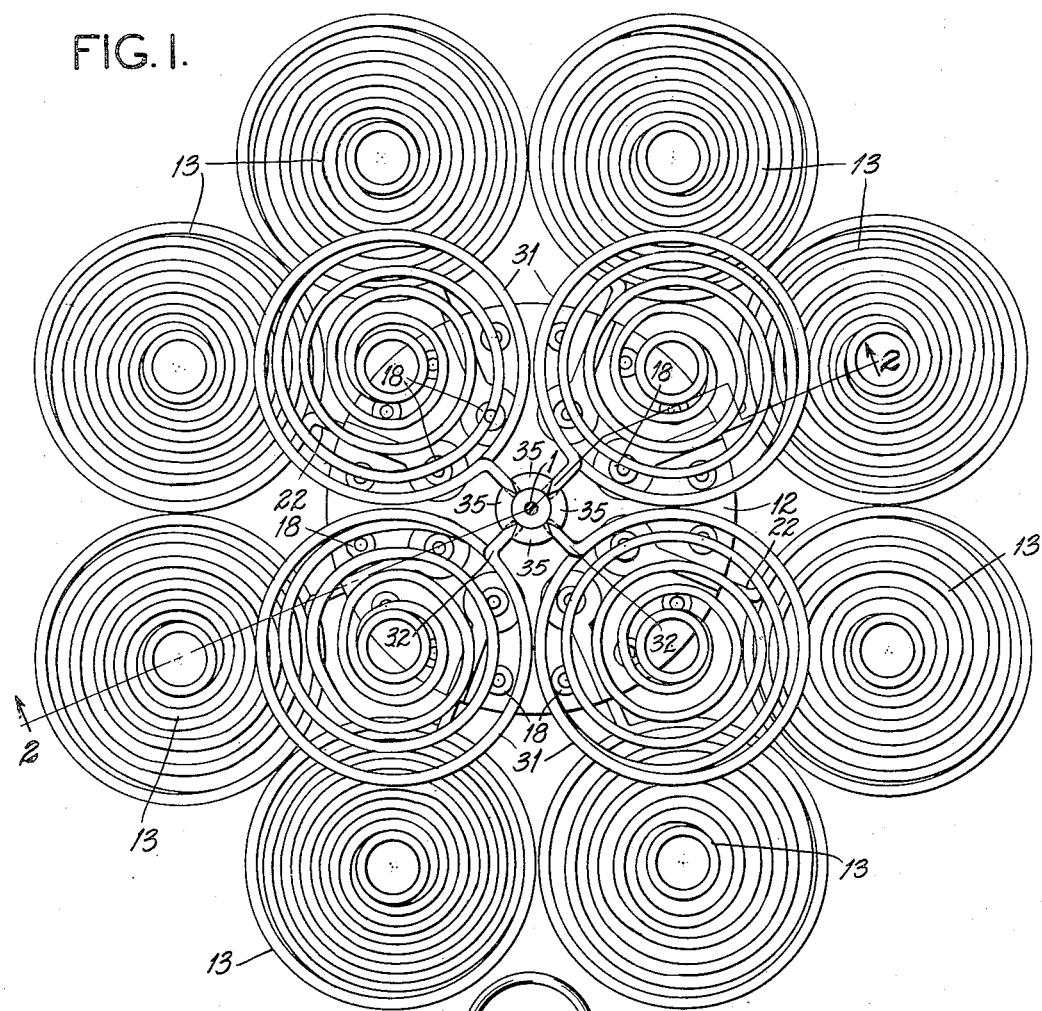
Figure 1 is a plan view of the device, the central handle member being shown in section.

Referring now to the drawings, the numeral 1 indicates a central handle member conveniently formed of a wire rod having its upper end bent in the form of a circle to form a handle, 2. At its lower end the rod 1 has secured thereon a stand, or supporting base, 3. This base comprises two pieces of wire, 4, 5, Figure 5, bent about the rod 1 and extending in parallel relation beyond opposite sides thereof, and being secured to the rod 1, and to each other, preferably by welding, as indicated at 6. From their outer points of connection the wires 4, 5 are then bent in a diverging relation to each other, Figure 5, to form bottom supporting members 7, which are in turn bent upwardly at right angles to form vertical supporting members, 8, each of which it bent outwardly at right angles at its upper end and curved upon itself to provide eyes, 9. The supporting members 7 are inclined downwardly in an outward direction, as indicated in Figure 3, to cause their outer ends or shoulders, 7a, to lie in a plane slightly below the plane of the lower end of rod 1, so that, when the device is at rest on the shoulders 7a, it will be prevented from centering on the lower end of said rod, which might cause it to wobble, as will be understood.

The numeral 10, Figure 3, indicates a circular clamping plate provided with a peripheral downwardly extending circular strengthening flange, 11, and the numeral 12 indicates a companion circular clamping plate, these two clamping members constituting the main support for the baskets, 13, of the lower series of baskets or holders. The clamping plate 12, as illustrated in Figure 4, is provided with a circular series of recesses, 14, each of which has a communicating radial recess, 15, extending to the periphery of the clamping plate, said recesses being struck upwardly from the underside of the clamping plate by a suitable die or press. The clamping plate 12 is further provided with two concentric series of apertures, the outer series of apertures, 16 lying adjacent the periphery of the clamping plate, while the inner series is so positioned that each aperture, 17, thereof is located in the center of a recess 14. The flange clamping member 10 is of the same diameter as the clamping plate 12 and is provided with two corresponding series of apertures to receive rivets, 18, passed through the apertures 16 and 17 of the clamping plate 12, as will be understood from an inspection of Figures 2 and 5.

Figure 2:
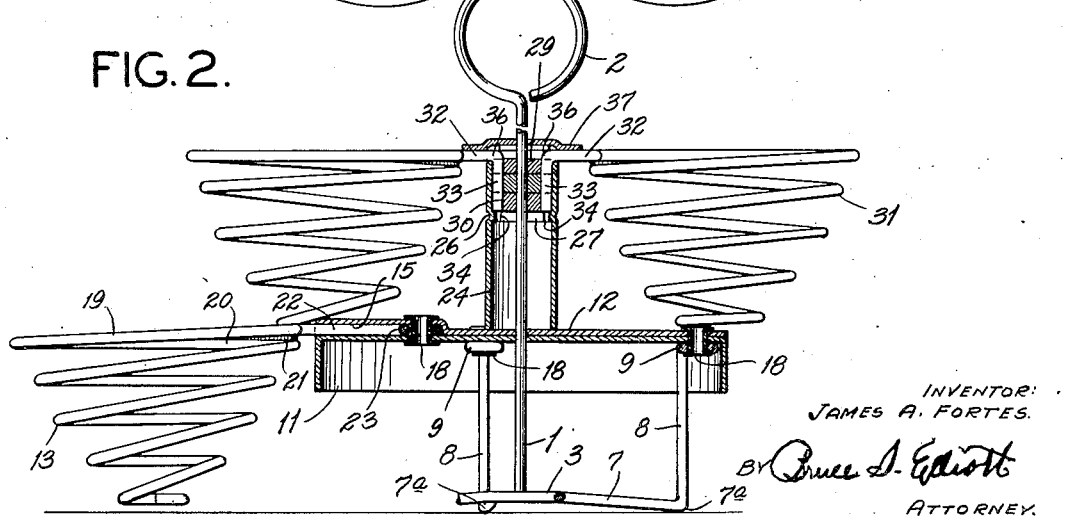
Figure 2 is a partial cross section taken on the line 2—2 of Figure 1.

Each of the baskets 13 is formed by spirally coiling a length of wire in such manner that the coils will be superposed and parallel, as indicated in Figures 2 and 3, the resultant structure being substantially conoidal in shape. The wire, 19, of the uppermost coil of each basket is caused to extend horizontally so that it will engage the upper side of the coil, 20, immediately beneath it, at which point the wire 19 and coil 20 are welded together, as indicated at 21. The wire 19 is furthermore extended radially outward from the basket to form an arm, 22, which is provided on its outer end with an eye, 23, Figures 2 and 3. Each of the recesses 14 with its radial recess 15 is of a shape and size to snugly receive the eye 23, and arm 22, of one of the baskets 13. In securing said baskets firmly in position, the clamping plate 12 with the arms 22 and eyes 23 of the lower series of baskets resting in the respective recesses 14 and 15 thereof, is placed upon the clamping member 11 and the rivets 18 are then passed through the apertures 17, the eyelets 23 and the corresponding apertures in the clamping member 11 and said rivets are then upset in the well known manner, and as illustrated in Figure 2. In this manner the clamping members 10 and 12 will be firmly united to each other, and the arms 22 or eye 23 of each basket is firmly secured between these clamping plates and within the recesses 14 and 15. Thus movement of the baskets in any direction will be prevented. Before bending the rod 1 to form the handle 2 it is passed upwardly through circular apertures in the clamping plates 10 and 12 and through parts of an upper supporting member to be hereinafter described, and in this way the eyes 9 on the vertical supporting members 8 on the base 3 are brought into engagement with the underside of the clamping member 10. The arrangement and proportioning of the parts is such that when the base 3 is so positioned the eyes 9 will align with four of the apertures or rivet holes in the clamping member 10 and, of course, with corresponding apertures 16 in the clamping plate 12. Rivets 18 are passed through the apertures 16, and four of these rivets will pass through the eyes 9, as indicated in Figures 2 and 5. In this manner the base 3 will be firmly secured to the central supporting member for the baskets formed by the clamping members 10 and 12, and the supporting member 7 extending outwardly such distance as to cause the eyes 9 to lie adjacent the periphery of the clamping member 10, a supporting base of relatively wide dimension is provided, necessary for a device of the relatively large size indicated by Figure 1 to prevent it from tipping over. It may be stated, in this connection, that Figure 1 shows the device in full size.

The four baskets constituting the upper series of egg holders are secured in position on a central support in a manner that will now be described.

The numeral 24 indicates a tubular supporting member, Figures 3 and 7, provided on its upper side with four equidistant slots, 25, and circularly depressed slightly above its vertical center, as indicated at 26, to provide an interior shoulder 27. This shoulder is for supporting a composit plug 28, Figure 6, which in the present case comprises three washers 29, Figure 2, provided with four equidistant and aligning grooves, 30. As explained in my prior application Serial No. 23,149, I employ washers to form the composit plug, as it is more economical to stamp out the grooves 30 in individual washers than it would be to machine the grooves in a solid plug. Each basket 31, of the upper series is formed exactly in the same manner as the baskets 13 of the lower series with the exception that the arms 32 radiating from each basket, corresponding to the arm 22 of the lower series of baskets, is bent downwardly at right angles to form vertical extensions, 33, the lower ends of these extensions being spread slightly in opposite directions, as by peening opposite sides of the wire, as indicated at 34, Figure 3, for a purpose to be presently described. In assembling the upper series of baskets, each of the downward extensions 33 is inserted into a groove 30 of plug 28, its widened end 34 extending beyond the sides of the groove at the bottom of the plug and thus preventing upward movement of the extension in the groove. The plug with the extensions 33 of the four baskets placed in the grooves thereof is then inserted in the upper end of the circular supporting member 24 and brought to rest upon the interior shoulder 27, the arms 32 of the baskets being received into the slots 25 of said tubular member. The four segments, 35, of the tubular member between the slots 12 are then swaged or turned over inwardly by a suitable implement which causes said segments to embrace and extend over the shoulder, 36, of each arm 32, as clearly shown in Figures 1 and 2. This not only secures the arms 32 in firm position in the plug 28, but also operates to force said plug into firm engagement with the shoulder 27, it being understood that when the segments 35 are turned inward their outer ends are thereby brought into engagement with the upper side of plug 28, or, which is the same thing, with the upper side of the uppermost washer 29. The height of the tubular member 24 is such that with its lower end resting on the upper side of the clamping plate 12 the bottoms of the baskets 31 will rest upon the upper side of said clamping plate, and as the sides of the upper coils of the baskets 31, as well as of the baskets 13, are in contact, as shown by Figure 1 there is practically no opportuntiy for lateral play or movement of the baskets.

In order to adapt the device to hold such articles as onions or potatoes, I preferably construct the baskets 13 of a somewhat larger size than the baskets 31, in actual practice, the baskets 13 being two and one-half inches in diameter at their upper, or wider end, and the baskets 31 being 2 inches in diameter.

Prior to mounting the washers, or plug 28, on the rod 1, a centrally apertured cover plate, 37, is placed on said rod, as shown by Figure 3 and after the parts have been assembled and secured in the tubular support 24, the cover plate 37 is then forced downward into position on top of the tubular member, as shown by Figure 2. This cover plate is of a diameter to extend outward over the arms 32 of the four baskets, and when pressed downward upon the same tend to stabilize the structure, as well as to increase the ornamental appearance of the device by concealing the manner of securing the arms 32 in the tubular member. The cover plate 37 may be secured in position in any desired way, but preferably this is done by causing it to firmly frictionally engage the rod 1.

As in the case of my prior application referred to, it will be understood that all of the parts of the device assembled in the tubular member 24 have a tight fit so that when assembled and secured together in the manner described, all of the parts of the assembly will be held in firm engagement and there can be no relative movement of any kind between them.

In the use of the device, after the eggs or other articles in the baskets have been cooked for a sufficient length of time, the device, after being lifted out of the boiling water, may be either suspended from a hook by means of the handle 2, or else placed on a table, shelf, or the like, and the eggs, or other articles, allowed to cool, in cases where this is desired. When not in use the device can be suspended or supported in the same way.

I claim:

1. An egg holder comprising two superposed series of baskets, the lower series having a greater number of baskets than the upper series, a pair of clamping plates between which the baskets of the lower series are secured in position, a tubular member mounted on said clamping plates and having the upper series of baskets secured therein, and a handle member connected to said clamping plates and extending upward through the same and through said tubular member to a point above the uppermost series of baskets.

2. An egg holder comprising two superposed series of baskets, the lower series having a greater number of baskets than the upper series, a pair of circular clamping plates between which the lower series of baskets are secured, supporting means for the upper series of baskets, a base secured to said clamping plates and a handle member secured at its lower end centrally of said base and extending upward through said clamping plates, and the supporting means for the upper series of baskets to a point above the latter.

3. An egg holder comprising two superposed series of baskets, the lower series having a greater number of baskets than the upper series and each basket of the lower series having an arm projecting radially therefrom and provided at its free end with an eye, a pair of clamping plates between which said arms extend, one of said clamping plates being provided with a series of circular recesses for receiving the eyes of said arms and communicating radial recesses for receiving said arms, said clamping plates being provided with concentric series of apertures, one set of said apertures being positioned centrally of said circular recesses, a base comprising four vertical wires having horizontally disposed eyes at their upper ends adapted to align with four of the apertures in the outer series of apertures, rivets passed through all of said apertures and through the eyes of said arms and support and clinched against corresponding parts at their under ends, a tubular member mounted on said clamping plates and supporting the upper series of baskets, the latter having radial arms fixedly secured therein, and a handle member secured at its lower end centrally of said base and extending upward through said clamping plates and said tubular member to a point above the upper series of baskets.

4. An egg holder comprising two circular clamping plates affording a central supporting member, a series of coiled wire baskets each of which has at its upper end a radial arm secured between said clamping plates, a tubular member mounted on said circular supporting member, a series of coiled wire baskets each of which has an arm secured in the upper end of said tubular member, a supporting base secured on the underside of said circular supporting member and a handle member secured at its lower end centrally of said supporting base and extending upward through said circular supporting member and said tubular member to a point above the baskets mounted in said tubular member.

5. An egg holder comprising a pair of clamping plates affording a central circular supporting member, a series of coiled wire baskets surrounding said circular supporting member, each of which has an integral radial arm secured between said clamping plates, a tubular member supported on said circular supporting member, a series of coiled wire baskets surrounding said tubular member, and each of which has a radial arm secured therein, the height of said tubular member being such that the bottoms of the baskets mounted therein will rest upon the upper side of said circular supporting member, a base secured on the underside of said circular supporting member, and a handle member secured at its lower end centrally of said base and extending upward through the same and through said tubular member to a point above the baskets mounted in the latter.

6. An egg holder comprising upper and lower central securing members, two superposed series of circular wire baskets fixedly secured, respectively, to said securing members in stationary relation to each other, the vertical centers of the lower series of baskets extending beyond the confines to the upper series, and a handle member secured to the central securing means and projecting above the uppermost series of baskets.

7. An egg holder comprising upper and lower central securing members, two superposed series of circular wire baskets fixedly secured, respectively, to said securing members in stationary relation to each other, the lower series having a larger number of baskets than the upper series, and the vertical centers of the lower series extending beyond the confines of the upper series, and a handle member secured to the central securing means and projecting above the uppermost series of baskets.

8. An egg holder comprising upper and lower central securing members, two superposed series of circular wire baskets fixedly secured, respectively, to said securing members in stationary relation to each other, the vertical centers of the lower series of baskets extending beyond the confines of the upper series, a supporting base, and a handle member secured to said supporting base and extending through the central securing means to a point above the uppermost series of baskets.

9. An egg holder comprising upper and lower central securing members, two superposed series of circular wire baskets fixedly secured, respectively, to said securing members in stationary relation to each other, the baskets of the lower series being of larger diameter than the baskets of the upper series and the vertical centers of the lower series extending beyond the confines of the upper series, and a handle member secured to said supporting means and projecting above the uppermost series of baskets.

10. An egg holder comprising an upper and a lower central circular securing member, the lower member being of larger diameter than the upper member, two superposed series of circular wire baskets fixedly secured, respectively, to said securing members in stationary relation to each other, the lower series having a larger number of baskets than the upper series and the vertical centers thereof extending beyond the confines of the upper series, a supporting base secured on the under side of said lower securing member, and and a handle member secured to said supporting base and extending through the central securing members to a point above the uppermost series of baskets.

JAMES A. FORTES.